United States Patent [19]

Hedrick

[11] Patent Number: 5,599,463
[45] Date of Patent: Feb. 4, 1997

[54] PHASE SEPARATOR APPARATUS AND ITS USE TO SEPARATE A MIXTURE OF LIQUIDS AND FINELY DIVIDED SUSPENDED PARTICLES

[75] Inventor: Brian W. Hedrick, Rolling Meadows, Ill.

[73] Assignee: UOP, Des Plaines, Ill.

[21] Appl. No.: 358,285

[22] Filed: Dec. 19, 1994

[51] Int. Cl.$^6$ .................................................. B01D 21/00
[52] U.S. Cl. ........................ 210/800; 210/802; 210/521; 210/522
[58] Field of Search .................................. 210/774, 800, 210/801, 802, 808, 519, 521, 522, 532.1, 538, 922

[56] References Cited

U.S. PATENT DOCUMENTS

| | | | |
|---|---|---|---|
| 1,005,977 | 10/1901 | Jones | 210/522 |
| 2,441,200 | 5/1948 | Langhurst | 210/802 |
| 3,399,135 | 8/1968 | Conley, Jr. et al. | 210/802 |
| 3,412,861 | 11/1968 | Rudbach et al. | 210/802 |
| 3,925,205 | 12/1975 | Sparham | 210/802 |
| 4,172,789 | 10/1979 | Huardeau | 210/802 |
| 4,477,344 | 10/1984 | Olszewski et al. | 210/522 |
| 4,783,255 | 11/1988 | Bogusch | 210/802 |
| 5,173,195 | 12/1992 | Wright et al. | 210/802 |
| 5,306,425 | 4/1994 | Graves | 210/802 |
| 5,340,470 | 8/1994 | Hedrick | 210/130 |

*Primary Examiner*—Robert J. Popovics
*Attorney, Agent, or Firm*—Thomas K. McBride; John G. Tolomei; John G. Cutts

[57] ABSTRACT

A process and apparatus for the separation of mixtures of liquids and finely divided suspended particles to produce a liquid product stream having a reduced concentration of finely divided suspended particles. The process and apparatus use a generally vertical separator vessel having a feed inlet distributor located in a lower locus of the vessel which directs the feed mixture in an upward direction in order to initially flow through a multiplicity of vertical and intersecting baffles located in the upper locus of the vessel and then to flow through a horizontal baffle having a multiplicity of holes to allow passage of the liquid and located above and adjacent to the vertical baffles.

3 Claims, 1 Drawing Sheet

PHASE SEPARATOR APPARATUS AND ITS USE TO SEPARATE A MIXTURE OF LIQUIDS AND FINELY DIVIDED SUSPENDED PARTICLES

FIELD OF THE INVENTION

The present invention relates to an apparatus and a process for the separation of mixtures of liquids and finely divided suspended particles. More particularly, the present invention is an apparatus containing a perforated plate to produce a pressure drop which plate is preceded by straightening vanes located below to ensure a uniform and smooth flow to the perforated plate.

BACKGROUND OF THE INVENTION

A variety of techniques have been used for separating suspensions of finely divided solids in a liquid solution including filtration, centrifugation, extraction and sedimentation. The details of these techniques are generally well known to those skilled in the art.

Gravitational separation utilizes the force of gravity to promote sedimentation and agglomeration of the heavier components from the mixture and the lighter components in the mixture tend to rise to the surface. The lighter phase is then removed from the surface by skimmers and other well-known techniques.

In order to enhance gravitational separation and coalescence in the prior art, high surface area sieves and plates are placed in the flow of the fluid being separated. Generally, the plates are welded or permanently attached to the sides of the separator tank. Generally, two interceptor plate orientations may be found in phase separators. The first, called the countercurrent design, includes a plurality, of parallel plates which are sloped at an angle either upwardly or downwardly, in the direction of waste water flow. The plates, therefore, force the mixture of liquid containing particles to flow in the direction of the plates' slope, either upwardly or downwardly. For example, when the plates are sloped upwardly, solids impinge on the top surface of the settling plates and slide down the plate due to the force of gravity against the flow of the waste water. When a second set of plates is used in series with the first, for example sloping downwardly, the coalesced lighter phase impinges upon the bottom surface of the plates and is forced to flow along the surface of those plates upwardly, against the flow of the liquid. Accordingly, the term "countercurrent separation" has been used to describe the process carried out in such a system. The disadvantage of the countercurrent separators is that the separated matter, either the lighter phase oil or the heavier phase solids, are always traveling against the flow of the liquid containing solids so that their progress is slowed. In addition, there is a higher tendency for turbulence and mixture of the phase flowing in the countercurrent direction. Another problem in countercurrent separators is clogging of the plates.

A more efficient separator design is embodied in the cross-flow or co-current separators. These separators have their plates sloped normal to the direction of the flow. When several stacks of plates are used, the stacks are arranged in parallel rather than in series. The liquid containing particulates enters the stack of sloped interceptor plates and flows in a parallel fashion through the plates, never forced upwardly or downwardly, since the plates slope downwardly or upwardly in a direction perpendicular to the flow. Therefore, while the liquid containing particulates being separated flows in a parallel fashion, the lighter or liquid phase material rises to the bottom surface of the upper interceptor plates and tends to rise upwardly in the direction of the slope of the plates while still flowing in the same direction of the flow. Likewise, the heavier phase material or solids settle to the top surface of the lower interceptor plates and follows the slope of the plate to the lower side or opposite side of the lighter phase material. Accordingly, both the heavy and lighter phase materials flow in the direction of the current of the liquid being separated, but in an opposite direction from each other across the surface of the plates. This type of separation process is therefore called crossflow co-current separation. The co-current separators have the advantage of reduced turbulence and mixing of the lighter and heavier phase components, since both components travel in generally the same direction of the liquid being treated.

U.S. Pat. No. 5,173,195 (Wright et al) discloses a phase separator apparatus which utilizes phase separator modules for insertion in a separation tank.

U.S. Pat. No. 5,340,470 (Hedrick et al) discloses a phase separator apparatus having multiple stacks of interceptor plates which divide the separation vessel to provide an annular space between the parallel interceptor plates and the vertical wall of the separation vessel to thereby form an inlet manifold for the plates which manifold provides a uniform, uninterrupted flow to each stack of plates. The arrangement of plates also forms an outlet manifold which provides a uniform flow from each stack of plates and directs the liquid stream having a reduced level of finely divided suspended particles downward in the separation vessel to an exit in the lower end of the vessel. The feed liquid is introduced into the lower end of the separation vessel with an inlet distributor which initially directs at least a majority of the feed liquid in a generally downward direction to effect a primary separation prior to being introduced into the stacks of parallel interceptor plates. The introduction of the feed liquid and the exit of the separated product streams from the lower end of the separation vessel balance the velocity heads on either side of the stacks of the parallel interceptor plates and eliminates horizontal surfaces which would accumulate solids.

Many of the prior art apparatus have complicated internal components which are expensive to construct and not suitable for certain heavy, viscous feedstocks because of potential plugging problems. In addition, an apparatus with a high density of relatively fragile internals is susceptible to unexpected pressure surges which can cause structural damage to the internals.

Accordingly, what is needed is a phase separator apparatus which is able to perform the desired separation while minimizing the complexity of the internal components. Those skilled in the prior art have sought a separation apparatus capable of high performance with the advantage of more open internal volume to provide the concomitant lower velocity for a given cross-sectional area.

BRIEF SUMMARY OF THE INVENTION

The separation apparatus of the present invention provides improved separation of liquids containing finely divided suspended particles by arranging a multiplicity of generally vertical and intersecting baffles in the upper locus of a generally vertical separator vessel to ensure a uniform and smooth flow of liquid in an upward direction. Immediately above these baffles is a generally horizontal baffle having a multiplicity of holes to allow the passage of the upwardly flowing fluid. The feed liquid is introduced into the lower end of the separation vessel with an inlet distributor which initially directs at least a majority of the feed liquid in a generally upwardly direction. The present invention also provides a process for the separation of a mixture of liquid and finely divided suspended particles. A preferred feed for separation in the present invention is a petroleum crude oil or a reduced petroleum crude oil.

In the apparatus of the present invention, the separation proceeds in accordance with Stokes Law whereby the diameter of a settled particle or droplet proceeds according to a calculated downward terminal velocity in contrast with an upward superficial velocity of the continuous phase. The horizontal baffle provides and ensures a uniform superficial velocity with the aid and cooperation of the vertical and intersecting baffles which serve as straightening vanes below the perforated horizontal baffle.

DETAILED DESCRIPTION OF THE INVENTION

Figure 1:
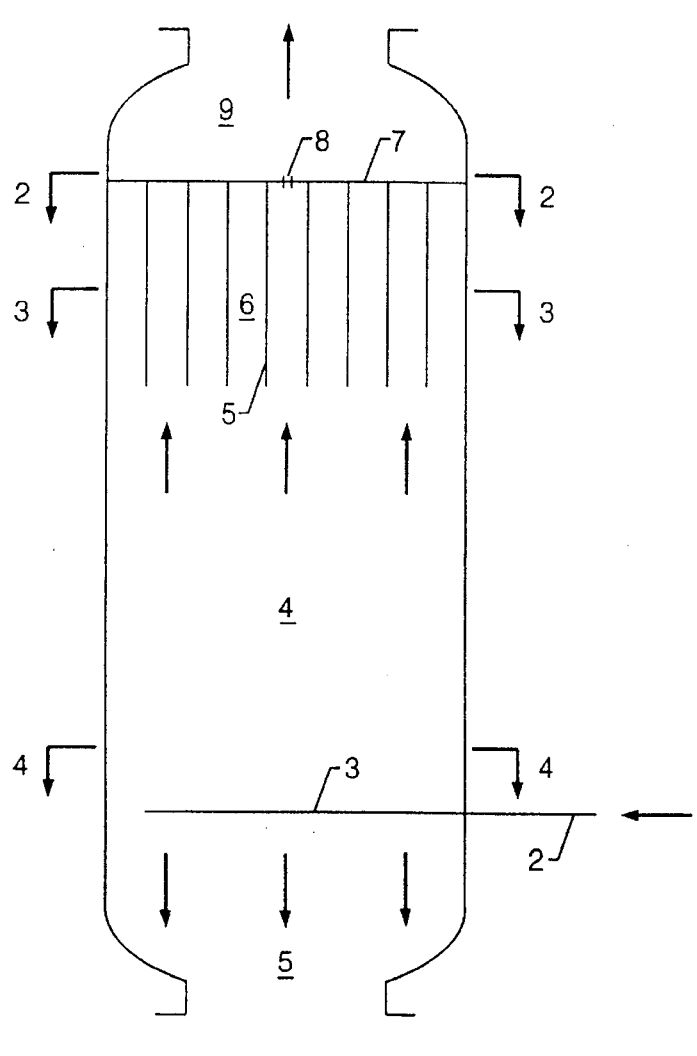
FIG. 1 is an elevational cutaway view of the novel separation apparatus of the present invention.

The novel phase separator of the present invention is illustrated in FIG. 1. A two-phase fluid stream is introduced into a phase separator 1 via at least one feed inlet pipe 2. Feed inlet pipe 2 transports the two-phased fluid stream and communicates with feed distributor 3 wherein the flowing fluid stream is distributed uniformly across the lower locus of phase separator 1 whereby at least a majority of the flowing fluid stream is discharged in an upwardly direction. A rough separation of the two-phase fluid stream is made in course separation zone 4. A heavy or solid phase which is separated in course separation zone 4 flows downwardly into lower separator locus 5. The resulting upwardly flowing stream enters an arrangement of a multiplicity of vertical and intersecting baffles 5 which define a typical vertical flow passage 6. Vertical flow passage 6 gives the flowing fluid stream a uniform and smooth flow characteristic which provides an environment for a final and efficient separation by settling of a heavy phase from the lighter continuous phase. The resulting heavy phase flows downward into lower separator locus 5. The lighter continuous phase continues in an upwardly direction and passes through a horizontal baffle 7 having a multiplicity of holes 8 and into upper locus 9 of phase separator 1 and is recovered.

Figure 2:
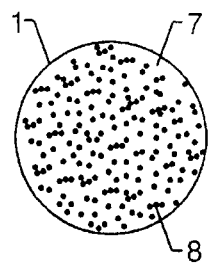
FIG. 2 is a section view taken across Section 2—2 of FIG. 1.

FIG. 2 is a cross-sectional view of section 2—2 in FIG. 1. Horizontal baffle 7 is shown having a multiplicity of holes 8 in relationship to phase separator 1.

Figure 3:
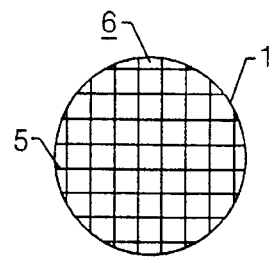
FIG. 3 is a section view taken across Section 3—3 of FIG. 1.

FIG. 3 is a cross-sectional view of section 3—3 in FIG. 1. A multiplicity of vertical and intersecting baffles 5 are shown to define a multiplicity of vertical flow passages 6 in relationship to phase separator 1.

Figure 4:
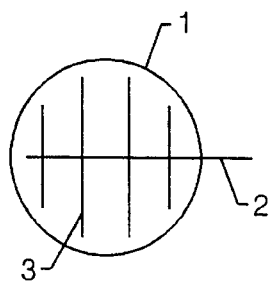
FIG. 4 is a section view taken across Section 4—4 of FIG. 1.

FIG. 4 is a cross-sectional view of section 4—4 in FIG. 1. Feed inlet pipe 2 and feed distributor 3 is shown in relationship to phase separator 1.

The apparatus of the present invention has utility in performing a phase separation in a deasphalting process in which a light paraffinic hydrocarbon is used to solubilize high molecular weight paraffins into the light phase and to reject a heavy phase containing asphalt. As the level of extraction is increased, the viscosity of the heavy phase increases thereby inhibiting mass transfer within the phase. Equilibrium between the phases is approached by intimate contact and the separation of the two phases. Intimate contact is accomplished via efficient mixing of the phase in a manner that exposes the maximum surface area of each phase to the other. Efficient separation is accomplished via the settling of the heavy phase from the lighter continuous phase. This separation is unfortunately limited by the size of the particles and/or droplets, the relative density of the two phases and the space available for settling. According to the present invention, a perforated horizontal plate at the top of the disengaging zone ensures uniform flow across the vessel cross-sectional area. In addition to achieving uniform flow, it is also necessary to set up a space below the perforated horizontal plate in which a uniform flow occurs to give the continuous phase time to achieve a uniform upward flow pattern. This is achieved via the use of vertical and intersecting baffles oriented below the perforated horizontal plate.

In accordance with one embodiment of the process of the present invention, a reduced petroleum crude oil is admixed with a deasphalting solvent and introduced into an apparatus of the present invention operating at conditions which include a pressure from about 400 to about 600 psig and a temperature from about 200° F. to about 500° F.

The present invention preferably utilizes a vertical, cylindrical separator vessel having generally vertical and intersecting baffles ranging in vertical length from about 4 to about 8 feet and located on centers ranging from about 6 to about 30 inches. The horizontal baffle incorporates holes or apertures ranging in diameter from about 0.25 to about 1 inch and the sum of the area of the holes ranges from about 5 to about 15 percent of the area of the horizontal baffle. The holes are preferably located uniformly across the surface of the horizontal baffle.

The apparatus and process of the present invention are further demonstrated by the following illustrative embodiment. The illustrative embodiment is, however, not presented to unduly limit the apparatus of this invention, but to further illustrate the advantages thereof. The following data were not obtained by the actual performance of the present invention, but are considered prospective and reasonably illustrative of the expected performance of the invention.

ILLUSTRATIVE EMBODIMENT

A charge stream in the amount of 10,000 mass units per hour and having the characteristics presented in Table 1 is admixed with 35,000 mass units per hour of deasphalting solvent and passed into a prior art extraction column operated at a pressure of about 600 psig and a temperature of about 350° F. A product stream is removed from the top of the extraction column and contains 6,000 mass units per hour of demetallized oil and has the characteristics presented in Table 1 and identified as Run A.

In Run B, the extraction apparatus of the present invention is used instead of the prior art extraction column of Run A, and Run A is repeated to yield a product stream from the top of the extraction column containing 6,000 mass units per hour of demetallized oil and has the characteristics presented in Table 1 and identified as Run B. From Table 1, it will readily be noted that for the same production of demetallized oil, the combined metal levels of the demetallized oil was reduced by 6.8 weight percent.

In Run C, the extraction apparatus of the present invention is again used to process a charge stream in the amount of 10,000 mass units per hour having the same characteristics as Runs A and B and is admixed with 35,000 mass units per hour of deasphalting solvent as a feed to the extraction apparatus at a pressure of 600 psig and a temperature of about 350° F. A product stream is removed from the top of the extraction column and contains 6,500 mass units per hour of demetallized oil, in contrast with 6,000 mass units per hour of demetallized oil for Runs A and B, and contains the same combined metals level as Run A.

Therefore, based upon the results presented in Table 1, the extraction apparatus of the present invention produces a demetallized oil product having a reduced level of metals or, in the alternative, produces 8.3 weight percent more demetallized oil having the same metals level as the prior art.

TABLE 1

|  | Feed | Run A | Run B | Run C |
| --- | --- | --- | --- | --- |
| Specific Gravity, °API | 4.19 | 10.6 | 10.8 | 9.8 |
| UOP K | 11.34 | 11.56 | 11.58 | 11.55 |
| Sulfur, Weight Percent | 4.8 | 3.70 | 3.65 | 3.75 |
| Nickel, Weight PPM | 39 | 10 | 9 | 10 |
| Vanadium, Weight PPM | 195 | 49 | 46 | 49 |
| Mass Percent of Feed | 100 | 60 | 60 | 65 |

The foregoing description, illustrative embodiment and drawing clearly illustrate the apparatus of the present invention and the benefits to be afforded with the use thereof.

What is claimed is:

1. A process for the separation of a mixture of liquid and finely divided suspended particles which process comprises:

(a) introducing a first mixture of liquid and finely divided suspended particles into a separator vessel;

(b) passing said first mixture through an inlet distributor located in a lower locus of said separator vessel in a generally upward direction to separate particles from said first mixture and produce a second mixture having a reduced concentration of finely divided suspended particles;

(c) passing said second mixture having a reduced concentration of finely divided suspended particles upwardly through an arrangement of a multiplicity of vertical flow channels defined by vertical baffles arranged in an intersecting pattern located in an upper locus of said separator vessel to thereby provide a uniform superficial flow;

(d) passing said second mixture upwardly from said flow channels through a generally horizontal baffle having a multiplicity of holes to allow the passage of upwardly flowing liquid;

(e) recovering a stream comprising finely divided particles from a lower locus of said separator vessel; and (f) recovering a third mixture having a further reduced concentration of finely divided suspended particles from an upper locus of said separator vessel above said baffle.

2. The process of claim 1 wherein said separator vessel is maintained at operating conditions including a pressure from about 400 psig to about 600 psig and a temperature from about 200° F. to about 500° F.

3. The process of claim 1 wherein said mixture of liquid and finely divided suspended particles comprises reduced petroleum crude oil.

* * * * *